Inventors:
Lars Johan Torsten Helmstein
Karl John William Jansson
by their Attorneys
Howson & Howson

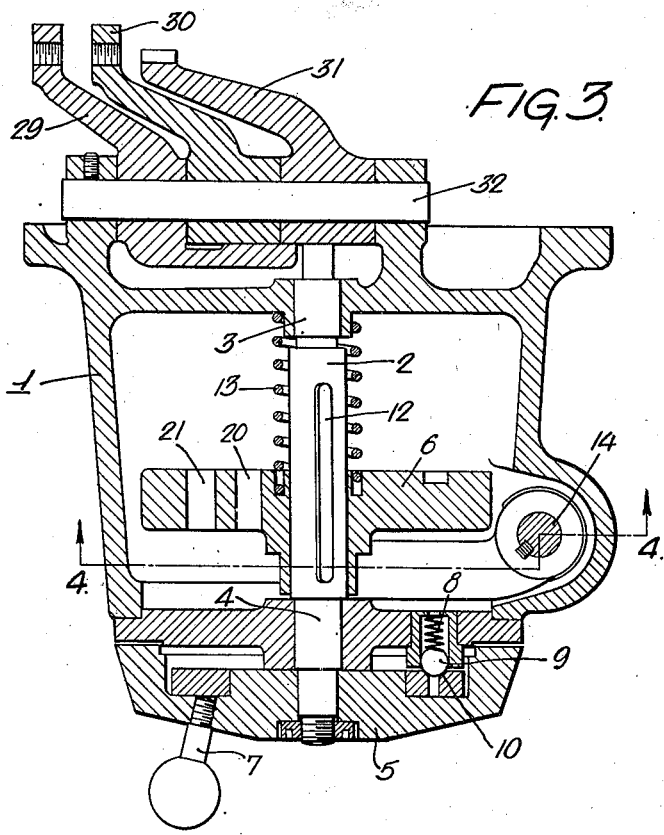
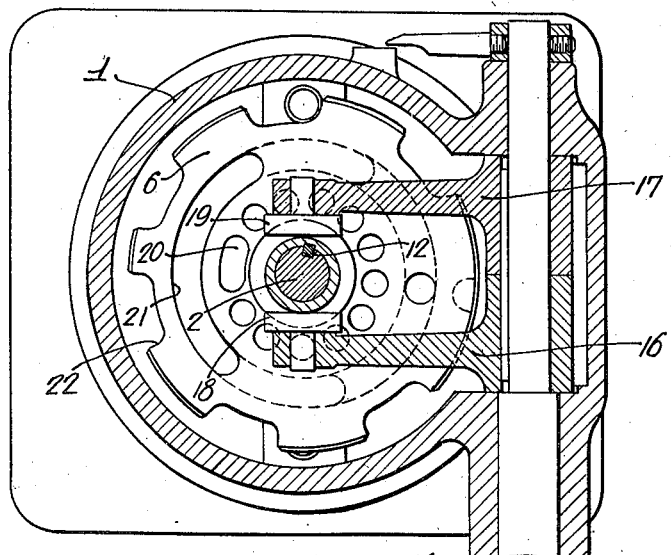

Patented Oct. 14, 1947

2,429,160

UNITED STATES PATENT OFFICE 2,429,160

SPEED SELECTOR FOR GEAR BOXES

Lars Johan Torsten Helmstein, Stockholm, and Karl John William Janson, Midsommarkransen, Sweden, assignors to SKF, Industries, Inc., Philadelphia, Pa., a corporation of Delaware Application April 15, 1944, Serial No. 531,194
In Sweden April 17, 1943

3 Claims. (Cl. 74—334)

The gear boxes of machine tools, especially those of turret lathes, have sometimes been provided with speed selectors which make it possible to set in advance members of the speed change mechanism for a desired speed ratio of the spindle. Instead of shifting to the next speed by means of two or three different levers as usual in a common gear box all speeds can be obtained in a gear box speed selector by means of a single lever and by the same movement, whereby the time required for shifting the gears is considerably diminished. The present invention relates to a speed selector of this type which is simpler in design and cheaper to manufacture than speed selectors of types hitherto known.

According to the invention there is a common controlling member for a plurality of gear shift actuating systems, the said controlling member being provided with a number of series of holes or contact surfaces corresponding to the number of actuating systems, the said series of holes or surfaces being located in a plurality of different planes, formed for example by cams, recesses, depressions, notches or the like, the said controlling member being arranged for cooperation with members included in the gear shift actuating systems for controlling the position of the said members.

Figure 1:
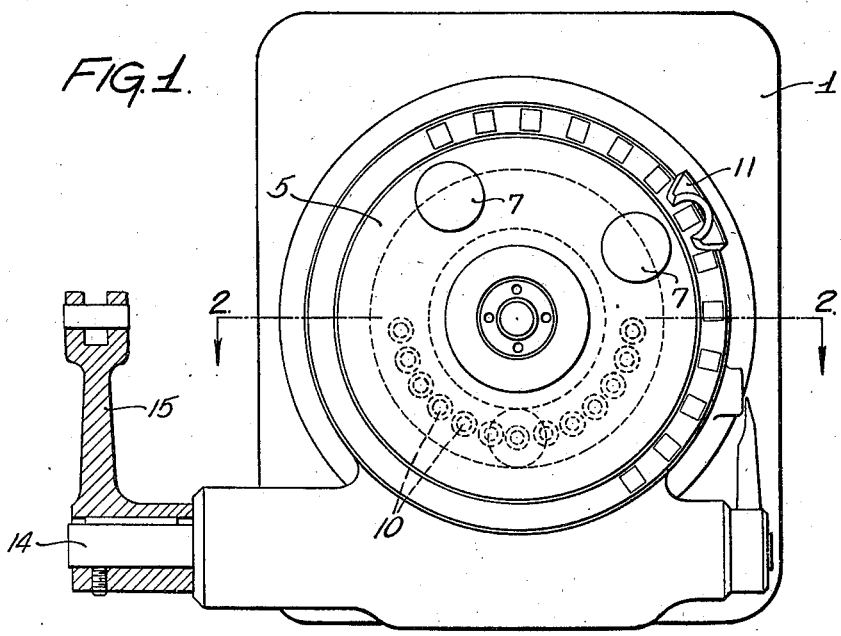
Figure 2:
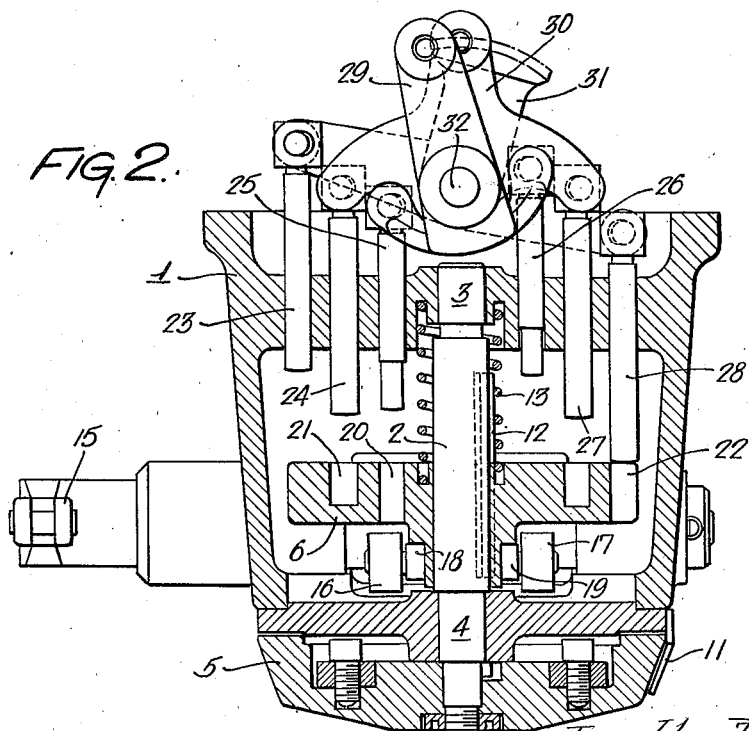
Figure 5:
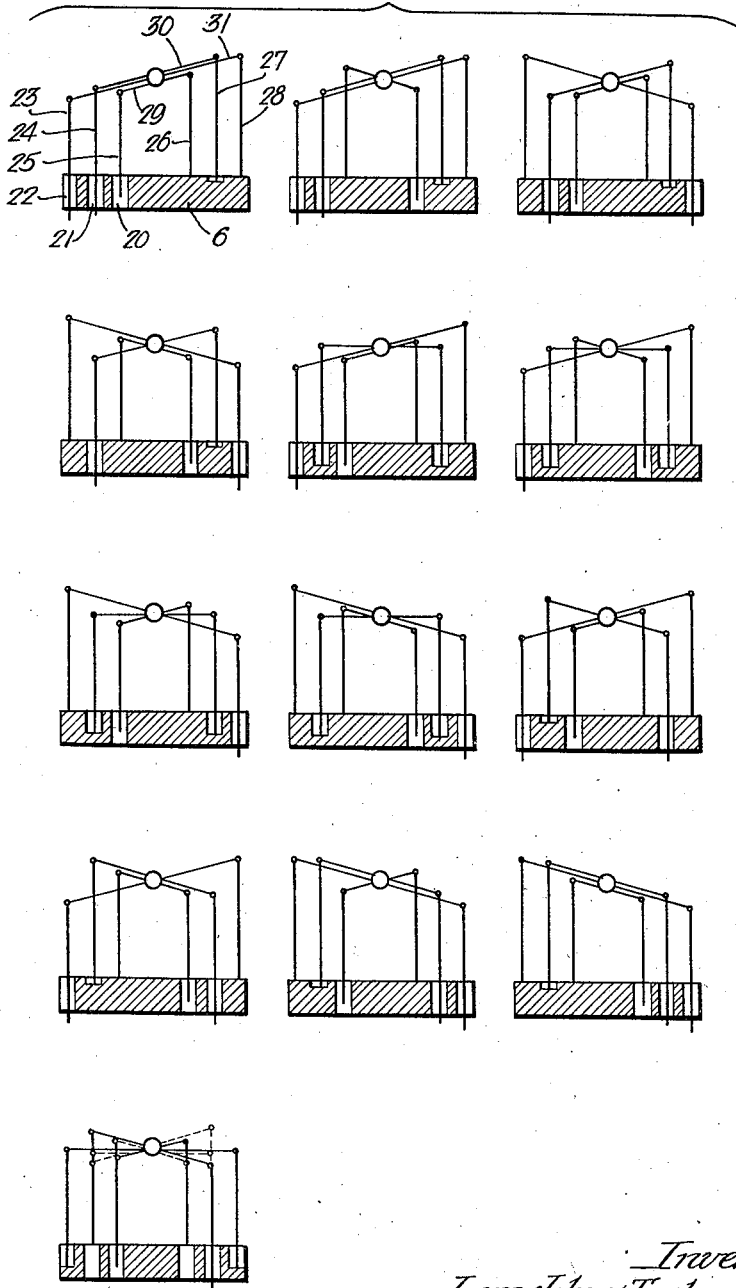

One embodiment of the invention is illustrated in the accompanying drawings in which Fig. 1 shows an external view of the speed selector partly in section. Fig. 2 shows a section along the plane 2—2 in Fig. 1. Fig. 3 shows a section perpendicular to the section of Fig. 2 and Fig. 4 a section along the line 4—4 in Fig. 3. Fig. 5 shows diagrammatically a number of different positions which can be obtained with the form of the invention shown in the above mentioned figures. The invention is described in the following as applied to a turret lathe.

In a housing 1 which is attached to a suitable part of the lathe, for example to the gear box, is mounted an oscillatable axle 2. On this axle, which has bearings at 3 and 4, is mounted an indicating disc 5 and a controlling disc 6. The indicating disc is provided around its edge with numerals indicating the gear ratios or speeds which can be obtained and is provided with a handle 7 by means of which it can be rotated to bring it to the desired of a number of different positions which are determined by a ball 9 actuated by a spring 8 to engage with a number of recesses 10 in the indicating disc as shown by dotted lines in Fig. 1 and of which one is shown in section in Fig. 3. The position of the indicating disc is shown by an indicator 11.

The indicating disc is connected to the axle 2 which consequently is turned when the indicating disc is turned to the desired gear ratio as shown by the indicator 11. This rotation of the axle 2 results in a rotation of the controlling disc 6 which is connected to the axle by means of a key 12. The controlling disc is slidable on the axle 2 but is retained in outer position by a spring 13.

Perpendicular to the axle 2 is another axle 14 which is oscillatable in the housing 1 and which is actuated by a suitable actuating member, for instance the lever shown in Fig. 1. The lever 15 can be actuated directly by hand or from another part of the machine by means of suitable motion transmitting mechanism. The axle 14 can therefore be turned by means of the lever 15 and the levers 16 and 17 through the shoes 18 and 19 displace the adjusting disc 6 of the axle 2 against the pressure from the spring 13.

The controlling disc 6 is provided with three concentric series of holes depressions or recesses 20, 21 and 22. These holes or recesses cooperate with six plungers 23, 24, 25, 26, 27 and 28, which are mounted in pairs on three levers 29, 30 and 31 oscillatable about an axle 32 perpendicular to the two axles 2 and 14. By arranging the holes in the series 20, 21 and 22 in combinations having different depths along different diameters in different angular positions of the controlling disc 6, the plungers will assume different positions, when the controlling disc 6, is pressed against the ends of plungers, the positions depending on character of the holes with which the plungers cooperate and which in turn depends on the adjustment of the indicating disc 5. In some cases it may happen that certain of the plungers abut against the disc between the holes. In the position shown in Fig. 2 the plunger 25 passes into the hole through the controlling disc, while the plunger 26 does not engage any of the holes. The lever 29 connected to these two plungers will then assume a position, inclined to the left in the figure. A system of gear shift actuating members such as links and levers (not shown in the drawing) actuate the gear box. The position of the gear wheels will therefore depend on the levers 29, 30 and 31 which depend in their turn on the positions of the plungers, as determined by the controlling disc 6. The angular position of the controlling disc is determined as above described by the position of the indicating disc 5. By this arrangements it is therefore possible to adjust beforehand the indicating disc according to the desired gear ratio, after which the controlling disc is pressed against the plungers when the gears are to be shifted.

Fig. 5 is a diagram showing some of the different positions which can be assumed by the levers 29, 30 and 31 and which result in different gear ratios. In the form of the invention described above it is possible to obtain 27 combinations which correspond to 27 gear ratios. Usually a smaller number of gear ratios will however be sufficient.

The invention has been described above as applied to a turret lathe. The use of the invention is however not confined to such lathes. It is also of course possible to alter the arrangement without departing from the spirit of the invention. Among other things the number series of holes in the adjusting disc and the number of cooperating lever systems, that is the number of combinations possible is theoretically unlimited, and is limited only by the practical possibilities of applying the invention.

Each series of contacting surfaces may contain surfaces on any desired number of levels, whereby each lever can be caused to assume any desired number of positions. The holes and recesses may be replaced with protuberances or cams.

Having thus described our invention, we claim and desire to secure by Letters Patent the following:

1. A gear shift actuating unit comprising in combination a hollow casing having an enclosed chamber, a shaft journaled in and intersecting said chamber and projecting through one end wall of the latter, means attached to the projecting end of the shaft for turning the latter, a disc keyed to the shaft within said chamber and traversible axially of the shaft, said disc having a plurality of annular series of apertures in the face thereof concentric with the axis of the shaft and differing from each other as to radial distance from said axis, means operative from the exterior of the casing for traversing said disc axially of the shaft, a transverse shaft mounted on the casing exterior to said chamber, and a plurality of gear shift levers journaled on the transverse shaft, each said lever having flexibly attached thereto a pair of pins at opposite sides respectively of the associated journal shaft extending through guide apertures in a wall of said casing into the path of the axial traverse of said disc, said pins being disposed so that the associated pairs thereof will coact respectively with the said series of apertures in the disc when the latter is traversed to adjust the levers about the journal shaft into positions determined by the angular setting of the disc shaft.

2. A gear shift actuating unit in accordance with claim 1 wherein the disc traversing means comprises a rock shaft journaled in the casing, arms extending from said shaft to the disc and having rollers for engagement with the latter, and a spring to resiliently hold the disc against said rollers.

3. A gear shift actuating unit in accordance with claim 1 wherein means is provided for positioning the disc as to angular adjustment about the disc shaft so that the said individual apertures are in accurate alignment with the inner ends of the pins.

LARS JOHAN TORSTEN HELMSTEIN.
KARL JOHN WILLIAM JANSON.

REFERENCES CITED

The following references are of record in the file of this patent:

UNITED STATES PATENTS

| Number | Name | Date |
| --- | --- | --- |
| 1,411,748 | Schmidt | Apr. 4, 1922 |
| 1,640,872 | Balzer et al. | Aug. 30, 1927 |
| 1,661,612 | Hulmes | Mar. 6, 1928 |
| 1,975,060 | Flanders | Sept. 25, 1934 |
| 1,997,841 | Twamley | Apr. 16, 1935 |